(United States Patent)

Herron et al.

Patent Number: 4,602,808
Date of Patent: Jul. 29, 1986

[54] PROTECTIVE ROUTING SLEEVE FOR HOSE ASSEMBLY

[75] Inventors: John R. Herron; Alan M. Spisak, both of Ft. Wayne, Ind.

[73] Assignee: Dana Corporation, Toledo, Ohio

[21] Appl. No.: 624,847

[22] Filed: Jun. 26, 1984

Related U.S. Application Data

[63] Continuation-in-part of Ser. No. 392,983, Jun. 28, 1982, abandoned.

[51] Int. Cl.$^4$ .............................................. F16L 11/12
[52] U.S. Cl. ........................................ 285/45; 285/115; 285/256
[58] Field of Search ............... 285/115, 116, 114, 256, 285/284, 45, 227

[56] References Cited

U.S. PATENT DOCUMENTS

| 438,356 | 10/1890 | McEnany | 285/114 X |
|---|---|---|---|
| 570,405 | 10/1896 | Jerguson et al. | 285/45 |
| 1,922,431 | 8/1933 | Geyer | 285/235 X |
| 2,166,448 | 7/1939 | Schuknecht et al. | 285/256 X |
| 2,185,741 | 1/1940 | Sorg et al. | 285/115 |
| 2,406,234 | 8/1946 | Marancik et al. | 285/227 X |
| 2,506,293 | 5/1950 | Copeland | 285/227 X |
| 2,700,988 | 2/1955 | Smisko | 285/45 X |
| 3,565,116 | 2/1971 | Gabin | 285/45 |
| 3,669,470 | 6/1972 | Deurloo | 285/45 |
| 3,707,032 | 12/1972 | Brunelle et al. | 285/45 X |
| 3,716,733 | 2/1973 | Keith et al. | 174/18 X |
| 3,784,236 | 1/1974 | Slocum | 285/115 X |
| 3,800,068 | 3/1974 | Torgerson | |
| 3,920,786 | 11/1975 | Brunelle et al. | |
| 4,114,929 | 9/1978 | Knapp | 285/45 |

FOREIGN PATENT DOCUMENTS

| 2102443 | 7/1971 | Fed. Rep. of Germany | 285/115 |
| 732529 | 6/1955 | United Kingdom | 285/45 |

OTHER PUBLICATIONS

Aeroquip Industrial Catalog No. 243 dated 9/1977, pp. 106 and 124.

Primary Examiner—Dave W. Arola
Attorney, Agent, or Firm—Frank B. McDonald

[57] ABSTRACT

A flexible corrosion-resistant tubular sleeve provides protection for hose assemblies subjected to abrasion, kinking, or accidental rupture due to flexure. The sleeve also provides routing control for hose end assemblies, providing greater axial strength, yet greater flexibility by the incorporation of a helical body portion. In a preferred embodiment, the sleeve is a single-piece body of molded polypropylene, and defines a pair of annular end portions integrally joined together by the helical body portion.

7 Claims, 2 Drawing Figures

PROTECTIVE ROUTING SLEEVE FOR HOSE ASSEMBLY

BACKGROUND OF THE INVENTION

This application is a continuation-in-part of a copending application of same title, filed June 28, 1982, and having U.S. Serial No. 392,983 and now abandoned.

This invention relates to sleeves installed on flexible hose assemblies for protection thereof, and for providing routing control of hose end assemblies. More particularly, the invention relates to such members having helical bodies installed over flexible hose lines for these purposes.

Many devices are employed for protection and routing control of hose assemblies. For example, rubber sleeves are installed over hydraulic brake lines which are typically mounted on the chassis of an automobile. As such lines are routed to movable front and rear suspension members which lead to individual wheel cylinders, the relative movement between suspension member and chassis parts creates an adverse environment for flexible hose by virtue of abrasion, chafing, or rubbing action. For reasons of strength, typical fittings are made of steel materials, which are susceptible to corrosion and subsequent failure when exposed to moisture. The rubber sleeves generally have a slightly larger inside diameter than the outside diameter of the hose to be covered, and are typically installed over the hose prior to crimping of a steel fitting to the hose. After installation and crimping of the fitting to the hose, the protective routing member is then pulled over the connected end of the metal fitting. For convenience of sliding the routing member over the hose and over the fitting, the routing member moves relatively easily over the hose as a result of a clearance space created by the difference between the inside diameter of the routing member and the outside diameter of the hose. However, the clearance subjects the fitting to intrusion of moisture, wherein the fitting becomes corroded and subject to failure.

Other routing devices have incorporated materials not subject to corrosion. For example, routing devices have also been made of inert materials including plastics such as polyethylene terephthalate. The surface hardnesses of such materials, however, have often been too great, resulting in abrasion of the associated hose assembly. Moreover, the latter devices have not possessed the requisite combination of flexibility and stiffness for good routing control.

Even where such devices have incorporated helical bodies, the operating characteristics of their structures have been less than desirable. For example, one plastic coil sleeve device must be physically wrapped about the hose member, and although quite flexible is without adequate stiffness for proper routing control. Another type of helical protective coil sleeve is made of steel, which of course is subject to corrosion. Moreover, the ends of the steel sleeve are often not flexible enough, and end-gouging damage and localized abrasion of the hose occurs. These factors result in an accelerated demise of the hose assembly, which may be subject to catastrophic rupture. This problem has been particularly acute where for example elastomeric hose is utilized for carrying high pressure liquids in systems involving cycle pressure changes. Under the latter conditions of operation, periodic movements of the external hose assembly will subject the hose material to damage by the rubbing thereof against associated mechanical members.

One other major drawback of prior art routing devices is in the inability of such devices to overlie a portion of a fitting on a hose end. To the extent that many of such devices are not designed to overlie and to be rigidly affixed to end fittings of hoses, the devices do not ensure adequate flexure protection to the hose portion at which the fitting is attached.

Thus a protective hose routing sleeve is needed which will provide a resilient, yet flexible external protection for a hose member, and particularly for an elastomeric hose for carrying high pressure hydraulic fluids.

SUMMARY OF THE INVENTION

This invention provides an improved protective member for hose lines which are subject to abrasion, kinking, or accidental rupture under conditions of cyclic flexure. Thus a resilient tubular sleeve provides an improved routing control of hose assemblies by the incorporation of a structural helical rib body portion made of a flexible, yet relatively stiff, corrosion material.

In a preferred embodiment, the sleeve is a single-piece tubular member molded over a hose end assembly. As such, the sleeve is rigidly affixed to a hose end fitting as well as to the connective hose portion to which the fitting is installed. This accommodation prevents deleterious moisture intrusion and resultant corrosion of the associated end fitting, and thus fully protects the fitting at the hose interface, unlike prior devices.

The sleeve contains a structural body portion which defines a helical structure, the ends of which are integrally joined to a pair of annular members. The sleeve is made of a relatively soft corrosion-resistant material, preferably a molded polypropylene.

DETAILED DESCRIPTION OF A PREFERRED EMBODIMENT

Figure 1:
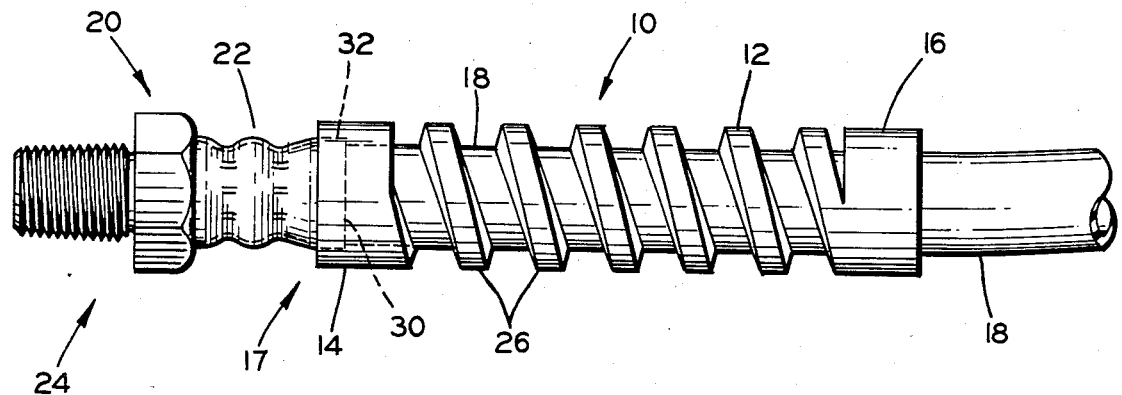
FIG. 1 is a full side view of one preferred embodiment of the protective routing sleeve of this invention.

A protective routing sleeve 10 in accordance with a preferred embodiment of this invention is shown in FIG. 1. The sleeve 10 as herein described is of a molded polypropylene material, and includes a helical structural spring body portion 12 integrally molded with, and hence integrally joined to annular end members 14 and 16. The sleeve is directly molded onto a hose assembly 17, which consists of a hose member 18 and a fittings element 20. In the example described herein, the hose member 18 is made of an elastomeric material. Also by way of example, the element 20 is a threaded male connector which is crimped onto the hose at 22, for connection of one end 24 of the hose member 18 to another hydraulic system member (not shown). The connector 20 may alternatively be bonded to the hose member of affixed by still other means. The sleeve 10 is directly molded about the interface 32 of the connector 20 and the hose member 18 so as to partially overlie the crimped portion 22 of the threaded connector element 20, thereby forming a routing member permanently affixed to both fitting and hose members. The interface 32 of the connector 20 and the hose member 18 will be such that the flared end 30 of the connector element 20 will be fully encapsulated by the molded polypropylene material of the annular end member 14.

It will now be appreciated by those skilled in the art that the routing sleeve 10 will provide a superior protective member for the hose assembly 17, as most connector fitting of the type represented by element 20 are fabricated of steel materials for reasons of strength. Although such members are plated with corrosion resistant metals, for example zinc, it will be appreciated that the zinc plating will occasionally deteriorate or flake away, leaving the steel exposed to moisture contamination. Although alternate materials have been tried, for example brass and aluminum, the latter have been unsatisfactory for several reasons including lack of strength. For instance, brass cannot be subjected to the high torques necessary for providing adequate closure, while aluminum is unduly subject to galvanic action and stress corrosion. Thus the present invention provides a system for avoiding the deleterious factors associated with the ulitization of steel fittings in moisture-laden and other corrosive or contaminating environments.

An in-place molding technique is preferred for the installation of the protective routing sleeve 10 of the present invention. The polypropylene material is applied by use of conventional injection molding dies in which pressures in the range of 80-100 pounds per square inch are employed. A favorable temperature range has been found to be approximately 400° Fahrenheit, plus or minus 20°. It is also noted that in-place injection molding of the latter sleeve 10 about the hose-connector interface 32 provides a means by which the fixation of the sleeve 10 to the assembly 17 is superior to that of other devices not molded in place. Thus the adherence of the sleeve 10 to the assembly is enhanced by a natural skrinkage of the sleeve which occurs during the cooling of the polypropylene material about the elastomer hose after the injection molding dies are removed.

Inherent to the nature of the helical structural spring body portion 12 is that both the axial and radial flexibility of the sleeve 10 are assured as the hose member 18 undergoes flexure and bending movements in a variety of planes. Thus, the protective sleeve 10 also has a superior routing control capability in hydraulic brake hose assemblies, which are subject to such movements.

It will also be seen that the flat circumferential surfaces 26 of the helically ribbed body portion 12 of the sleeve 10 provide means for achieving abrasionless contact of the hose member 18 against mechanical members external to the hose, and which might otherwise abrad or cause damage to the hose during its useful life. The molded interface 32 provides a mechanical lock between the annular end 14 and the flared end 30 of the element 20. Moreover, to the extent that the annular ends 14 and 16 are an integral part of the single-element sleeve 10, and thus provide additional means for gripping the assembly 17, there is less tendency for the body portion 12 to slide axially along the hose member 18 as the latter undergoes flexure and bending motions. The ends 14 and 16 also aid to avoid end gouging or localized abrasion of the elastomeric hose material, which has been a major drawback of the steel protective coil springs of the prior art.

Figure 2:
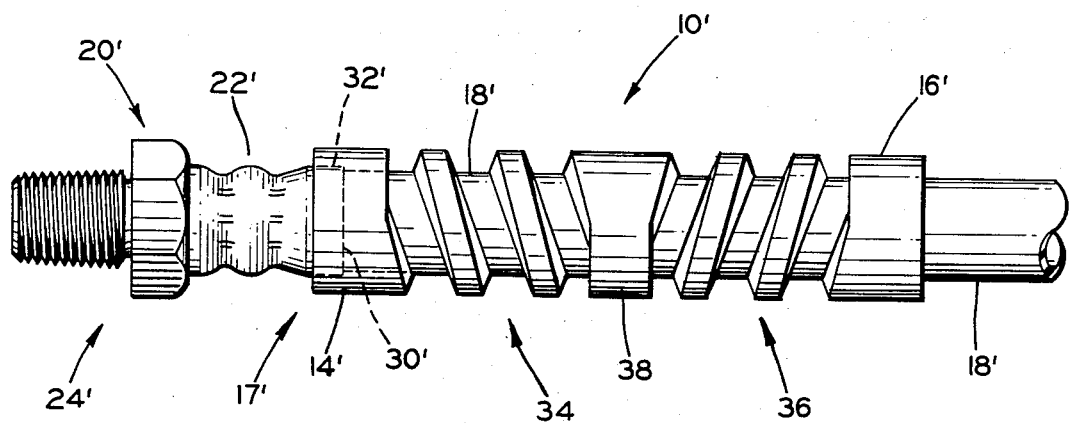
FIG. 2 is a similar view of a second preferred embodiment.

An alternate preferred embodiment 10' of the routing sleeve is shown in FIG. 2. As earlier mentioned, the annular ends 14 and 16 of the sleeve 10 (FIG. 1) minimize the tendency for the body portion 12 to slide axially along the hose member during articulation or bending motions. Under conditions of severe articulation, however, the sleeve 10 tends to creep along the hose when the hose is flexed in one direction, while creeping in the opposite direction when the articulation is reversed. The embodiment of FIG. 2 affords a counteraction to the creeping phenomenon. Thus, the sleeve 10' employs two distinct sections 34 and 36, each having equal but oppositely directed helixes, separated by a centered annular ring 38. The effect of the opposing helixes is to counteract the axial forces otherwise developed by a unidirectional helix (as per FIG. 1). The mid-span location of the centered annular ring 38 (FIG. 2) alleviates any tendency for there to be a net or resultant unidirectional force on the sleeve.

Thus, the protective helical routing sleeve 10, 10' for hose assemblies of this invention provides an improved resilient flexible tubular member which is markedly more suitable for hose assemblies than were previously available routing members. Additionally, the non-corrosive attributes of the sleeve enhance its utility in moisture-laden environments, particularly where such devices involve steel fittings.

What is claimed is:

1. In combination, a (1) brake hose assembly comprising a hose member having a connector element at one end thereof, said member and said member defining an interface, and a (2) flexible, abrasion-resistant, protective routing sleeve molding onto said hose member and said element; said sleeve comprising two annular end portions and a helical rib spring body portion extending axially between said end portions and integrally joined to said end portions, one of said annular members, fully encapsulating said interface for sealing against intrusion of moisture under conditions of cyclic flexure of said assembly.

2. The combination of a hose assembly comprising a hose member and a connector element secured thereto, said member and element defining an interface, a tubular sleeve disposed over the tubular hose assembly comprising a structural body portion defining a helical member, a pair of annular members each affixed to an end of said helical member, said helical member comprising a pair of equal but oppositely directed helixes having a centered integral annular ring positioned therebetween, one of said annular members fully encapsulating said interface for sealing against intrusion of moisture.

3. The sleeve of claim 2 wherein said sleeve comprises an integral single-element body of resilient, molded, non-corrosive material.

4. The sleeve of claim 3 wherein said resilient molded material is polypropylene.

5. The combinations of (1) a hose assembly comprising (a) a tubular hose member and (b) a hose end connector fitting secured thereto, said member and said fitting thereby defining an interface; and (2) a tubular sleeve disposed over said hose assembly, said sleeve comprising a flexible helical structural spring body portion disposed for accomodating cyclic flexure of said hose assembly, and a pair of annular members each fixed to an end of said helical spring body portion, wherein one of said annular members fully encapsulates said interface for sealing against intrusion of moisture under conditions of cyclic flexure of said assembly.

6. The sleeve of claim 5 wherein said sleeve comprises a single-element body of resilient, molded, non-corrosive material.

7. The sleeve of claim 6 wherein said resilient molded material is polypropylene.

* * * * *

UNITED STATES PATENT OFFICE
CERTIFICATE OF CORRECTION

PATENT NO. : 4,602,808
DATED : July 29, 1986
INVENTOR(S) : John R. Herron; Alan M. Spisak It is certified that error appears in the above-identified patent and that said Letters Patent are hereby corrected as shown below:

In column 4, line 25, please delete the word "member" (second occurrence only) and substitute the word --element-- therefor.

Signed and Sealed this

Tenth Day of March, 1987

Attest:

DONALD J. QUIGG

Attesting Officer

Commissioner of Patents and Trademarks